United States Patent [19]

Doi et al.

[11] 4,446,283

[45] May 1, 1984

[54] CROSSLINKABLE POLYETHYLENE RESIN COMPOSITION

[75] Inventors: Shuhei Doi; Tsutomu Isaka, both of Yokkaichi; Shinichiro Iida, Mie, all of Japan

[73] Assignee: Mitsubishi Petrochemical Company Limited, Tokyo, Japan

[21] Appl. No.: 386,574

[22] Filed: Jun. 9, 1982

[30] Foreign Application Priority Data

Jun. 16, 1981 [JP] Japan ............................. 56-92593

[51] Int. Cl.³ .......................................... C08G 77/20
[52] U.S. Cl. .................. 525/344; 525/326.5; 525/353; 525/355; 525/370; 525/375; 525/379; 525/386; 526/279
[58] Field of Search ............... 525/344, 353, 355, 370, 525/375, 379, 386, 326.5; 526/279

[56] References Cited

U.S. PATENT DOCUMENTS

| 3,453,136 | 7/1969 | Bylsma ............................. | 526/279 |
| 3,764,589 | 10/1973 | Bond, Jr. et al. ................. | 526/279 |
| 3,884,891 | 5/1975 | Samoilov et al. ................. | 526/279 |
| 4,035,540 | 7/1977 | Gander ............................. | 526/279 |
| 4,297,310 | 10/1981 | Akutso et al. .................... | 525/326 |

FOREIGN PATENT DOCUMENTS 54-6095912 12/1979 Japan .
55-6126213 3/1980 Japan .

*Primary Examiner*—Joseph L. Schofer
*Assistant Examiner*—Bernard Lipman
*Attorney, Agent, or Firm*—Robert E. Burns; Emmanuel J. Lobato; Bruce L. Adams

[57] ABSTRACT

A novel crosslinkable polyethylene resin composition which can be readily crosslinked rapidly is provided. The composition comprises a copolymer consisting essentially of ethylene and a specific unsaturated silane compound having a (meth)acrylate group as a copolymerizable group and a methoxy group as a hydrolyzable group, and an effective amount of a silanol condensation catalyst.

9 Claims, 2 Drawing Figures

CROSSLINKABLE POLYETHYLENE RESIN COMPOSITION

BACKGROUND OF THE INVENTION

1. Field of the Art

This invention relates to crosslinkable polyethylene resin compositions. More particularly, it relates to a water-crosslinkable polyethylene resin composition which comprises a copolymer of ethylene and an unsaturated silane compound having hydrolyzable silane groups as the crosslinkable group and a catalyst for crosslinking reaction.

2. Prior Art

A polyethylene resin such as low-density polyethylene and the like has been generally crosslinked to enhance its mechanical strength and heat resistance.

As one of such crosslinking measures, it has been known that the polyethylene to be used can be made crosslinkable by introduction of a crosslinkable group and, in this case, a hydrolyzable silane group is utilized as the crosslinkable group. For example, (i) as described in Japanese Patent Laid-open Publn. No. 9611/1980, a copolymer of ethylene and an unsaturated silane compound represented by the formula $RSiR'_nY_{3-n}$ (wherein: R is an ethylenically unsaturated hydrocarbyl or hydrocarbyloxy group; R' is an aliphatic saturated hydrocarbyl group; Y is a hydrolyzable organic group; and n stands for 0, 1 or 2), or (ii) as described in Japanese Patent Publication No. 1711/1973, an unsaturated silane compound-graftpolymerized polyethylene prepared by graftpolymerization of an unsaturated silane compound onto polyethylene in the presence of a free radical generator, is crosslinked by contacting it with water in the presence of a silanol condensation catalyst.

The above described methods are advantageous in comparison with other conventional crosslinking procedures such as a method using irradiation with radiation rays or a method utilizing decomposition of organic peroxides which have been incorporated in the resins. For example, in the irradiation method not only is a special costly apparatus required, but also it is very difficult to accomplish uniform crosslinking in the case of molded products of thick walls or of complicated shapes. Thus, this method is not practicable. On the other hand, the method using organic peroxides often results in poor quality of the molded or formed products and, more seriously, sometimes in failure of the molding process to continue because the crosslinking based on decomposition of the peroxides occurs during the molding step. Furthermore, on conducting the crosslinking step after the molding, a high temperature-decomposable peroxide which can withstand the molding temperature must be used, and thus the molded product must be heated to a temperature higher than the molding temperature to decompose such peroxides. As a result, the molded product undergoes changes due to softening and also results in poor quality of the molded product.

Furthermore, there have been problems encountered in using an ethylene-unsaturated silane compound copolymer or an unsaturated silane compound-graftpolymerized polyolefin. More specifically, a vinylalkoxysilane such as vinyltrimethoxysilane or vinyltriethoxysilane has been used as the unsaturated silane compound in these cases. However, the composition wherein the vinylalkoxysilane is used is not always satisfactory in its crosslinking velocity and thus requires a long time for crosslinking. An improvement in this respect has been greatly desired.

SUMMARY OF THE INVENTION

It is an object of the present invention to solve the above described problems by using, instead of the conventional vinylalkoxysilane, a specific unsaturated silane compound different therefrom as the unsaturated silane compound.

Thus, the crosslinkable ethylene copolymer composition according to the present invention comprises the following components (A) and (B):

(A) A copolymer consisting essentially of ethylene and an unsaturated silane compound represented by the formula,

$$CH_2=C(R)COO(CH_2)_xSIR'_y(OCH_3)_{3-y}$$

wherein, R is hydrogen or a $C_1$ to $C_4$ alkyl group, R' is a $C_1$ to $C_4$ alkyl group, x stands for an integer from 1 to 6, and y stands for 0, 1 or 2; and (B) A silanol condensation catalyst, the quantity thereof being in the range of 0.001 to 10% by weight of the total weight of the components (A) and (B).

The present invention has succeeded in solving the problem of unsatisfactory crosslinking velocity in the case of the polyethylene resin wherein a vinylalkoxysilane is introduced, by using a polyethylene resin wherein the specific unsaturated silane compound represented by the above general formula has been introduced instead of the vinylalkoxysilane. As a result, the composition of the present invention can be crosslinked even at room temperature.

Thus, a crosslinked polyethylene resin can be readily obtained in a short period of time in accordance with the present invention.

DETAILED DESCRIPTION OF THE INVENTION

1. Ethylene-Unsaturated Silane Compound Copolymer

(1) Copolymer

Figure 1:
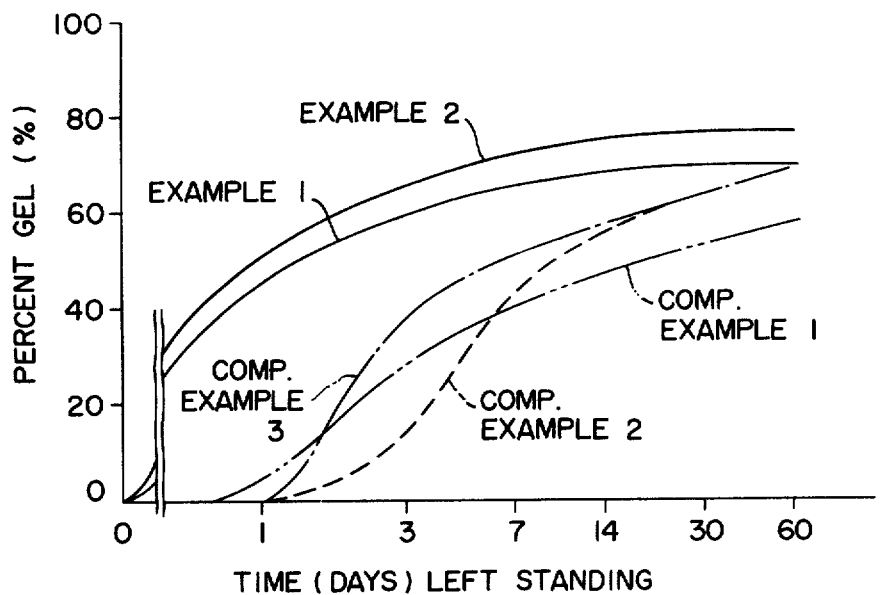
FIG. 1 is a graph indicating crosslinking velocities when the copolymers according to Examples 1 and 2 as well as Comparative Examples 1 through 3 set forth hereinafter were crosslinked by allowing them to stand at room temperature.

The copolymer can be in the form of a normal copolymer of ethylene and the unsaturated silane compound specified above, and/or a copolymer of polyethylene resin, viz. polymeric ethylene, and the unsaturated silane compound, that is, a graft copolymer thereof. The term "normal copolymer" or "normal copolymerization" herein means a product or process in which monomeric ethylene and the monomeric silane compound are subjected to copolymerization to form the copolymer. The term "graft copolymer" or "graft copolymerization" herein means a product or process in which polymeric ethylene and the monomeric silane compound are subjected to copolymerization to form the copolymer.

The former copolymer is preferred from the viewpoint of the stability and processability of the copolymer as well as the properties of the resulting crosslinked copolymer such as heat-welding property and the like.

(2) Unsaturated silane compound

The unsaturated silane compound to be used in the present invention is represented by the following formula,

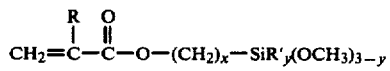
$$CH_2=C-C-O-(CH_2)_x-SiR'_y(OCH_3)_{3-y}$$

wherein: R is hydrogen or an alkyl group of one to four carbon atoms, preferably hydrogen or methyl group; R' is an alkyl group of one to four carbon atoms, preferably methyl group; x is an integer from 1 to 6, preferably 3 to 5; and y is 0, 1, or 2, preferably 0. The unsaturated silane compound which has been found to be most preferable is the compound shown by the following formula,

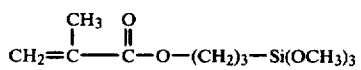
$$CH_2=C-C-O-(CH_2)_3-Si(OCH_3)_3$$

(3) Copolymerization (1) Normal copolymerization

The ethylene-unsaturated silane copolymer can be obtained by copolymerizing ethylene and the unsaturated silane compound, for example, in the manner described in Japanese Patent Laid-open Publn. No. 9611/1980.

The copolymerization of ethylene and the unsaturated silane compound may be carried out under any suitable conditions that cause polymerization thereof. More specifically, the copolymerization can be conducted by contacting these monomer components all at once or stepwise in a tank or tube reactor, preferably a tank reactor or an autoclave, under the conditions of a pressure of 500 to 4,000 Kg/cm$^2$, preferably 1,000 to 4,000 Kg/cm$^2$, a temperature of 100° to 400° C., preferably 150° to 350° C., and the presence of a radical initiator and, if desired, a comonomer copolymerizable with ethylene and/or a chain transfer agent.

In the present invention, any radical initiator, comonomer and chain transfer agent there are known to be usable in the conventional homopolymerization or copolymerization process of ethylene can be used.

Examples of the radical initiators are: an organic peroxide such as lauroyl peroxide, dipropionyl peroxide, benzoyl peroxide, di-t-butyl peroxide, t-butylhydroperoxide and t-butyl peroxy isobutyrate; molecular oxygen; and an azo compound such as azobisisobutyronitrile and azoisobutylvaleronitrile. Examples of the comonomers are: (a) vinyl carboxylate esters such as vinyl acetate and vinyl pivalate, (b) (meth)acrylates such as methyl (meth)acrylate and butyl (meth)acrylate, (c) olefinically unsaturated carboxylic acids such as (meth)acrylic acid, maleic acid and fumaric acid, (d) (meth)acrylic acid derivatives such as (meth)acrylonitrile and (meth)acrylamide, and (e) vinyl ethers such as vinyl methyl ether and vinyl phenyl ether. Of these comonomers, the vinyl ester of a monocarboxylic acid having 1 to about 4 carbon atoms such as vinyl acetate, and the (meth)acrylate of an alcohol having 1 to about 4 carbon atoms such as methyl (meth)acrylate are preferred. Two or more of such olefinically unsaturated compounds can be used in combination. The term "(meth)acrylic acid" used herein means both acrylic acid and methacrylic acid.

Examples of the chain transfer agents are paraffin hydrocarbons such as methane, ethane, propane, butane, pentane, hexane and heptane; α-olefins such as propylene, butene-1 and hexene-1; aldehydes such as formaldehyde, acetaldehyde and n-butylaldehyde; ketones such as acetone, methyl ethyl ketone and cyclohexanone; aromatic hydrocarbons; and chlorohydrocarbons.

The copolymer to be used in the present invention contains the unsaturated compound unit in a quantity of 0.001 to 15%, preferably 0.01 to 5%, and more preferably 0.05 to 2% by weight.

The quantity of the comonomer unit (if used) is generally in the range of 0.5 to 40%, preferably 0.5 to 35%, and especially 1 to 25% by weight.

(2) Graft-copolymerization

The other method for obtaining the ethylene-unsaturated silane compound copolymer comprises graft-copolymerizing the unsaturated silane compound onto the polyethylene resin, for example, in the manner as described in Japanese Patent Publication No. 1711/1973.

More specifically, the unsaturated silane compound-grafted polyethylene resin is prepared by heating the unsaturated silane compound and a polyethylene resin such as ethylene homopolymer, a copolymer of ethylene and an α-olefin, a copolymer of ethylene and a vinyl ester, a copolymer of ethylene and (meth)acrylic acid or an ester thereof, or a halogenated polyethylene in the presence of a free radical generator at a temperature higher than the decomposition temperature of the generator. In addition to the method by decomposition of a free radical generator, the free radicals for the polyethylene resin can also be generated by irradiation with high-energy radiation or the like.

The free radical generator can be any compound that can generate free radicals on the polyethylene resin under the reaction conditions. Typical examples of the generator are organic peroxides such as dicumyl peroxide, benzoyl peroxide and t-butyl peroxide and azo compounds such as azoisobutyronitrile and methyl azoisobutyrate.

The quantities of the unsaturated silane compounds and free radical generator to be used depend on the objective quality of the product, the reaction conditions and the other factors and can be readily determined over broad ranges by users. In general, it is suitable that the quantity of the silane compound be 0.5 to 15% and that of the generator be 0.01 to 2% by weight of the polyethylene resin.

The step of graft-copolymerization generally comprises heating a mixture of the polyethylene resin, the unsaturated silane compound and the free radical generator by means of a kneading machine such as an extruder or a Banbury mixer to a temperature between the melting point of the polyethylene resin and the decomposition temperature thereof, generally in the range of 150° to 300° C.

From the viewpoint of the stability, processability, etc. of the resulting graft-copolymer, an unsaturated silane compound which does not contain impurities such as inorganic acids, organic acids and other materials which may produce such acids is suitable. (Incidentally, an unsaturated silane compound which does not contain such impurities is also preferred in the case of the normal copolymerization.) More specifically, the content of an acid corresponding to the formula

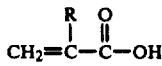

in the unsaturated silane compound should be preferably not more than 200 ppm, especially not more than 100 ppm, and the content of chlorine (Cl) therein should be preferably not more than 400 ppm, especially not more than 200 ppm.

Also in this case, the graft-copolymer contains the unsaturated silane compound in a quantity of 0.001 to 15%, preferably 0.01 to 5%, more preferably 0.05 to 2%, by weight.

2. Silanol Condensation Catalyst

A catalyst which can be used for promoting dehydration condensation between the molecules of silicone silanols is also utilized generally in the present invention. In general, such silanol condensation catalysts can be a carboxylate of a metal such as tin, zinc, iron, lead and cobalt, an organic base, an inorganic acid and an organic acid.

Examples of the silanol condensation catalyst are dibutyltin dilaurate, dibutyltin diacetate, dibutyltin dioctate, stannous acetate, stannous caprylate, lead naphthenate, zinc caprylate, cobalt naphthenate, ethylamines, dibutylamines, hexylamines, pyridine, inorganic acids such as sulfuric acid and hydrochloric acid, and organic acids such as toluene sulfonic acid, acetic acid, stearic acid and maleic acid.

The amount of the silanol condensation catalyst to be used can be suitably determined by users with reference to the examples given below with respect to a selected catalyst for a given copolymer. Generally speaking, the quantity to be used is 0.001 to 10%, preferably 0.01 to 5%, especially 0.01 to 1%, by weight of the entire reaction materials.

3. Preparation of Compositions

The composition of the present invention can be prepared according to any method that can be employed for incorporating various additives into thermoplastic resins.

A variety of methods can be applied for the preparation of the present composition. The method of preparing the composition generally comprises melting and/or dissolution (melting in many cases) of the ethylene-unsaturated silane compound copolymer or the silanol condensation catalyst and, for example, comprises kneading the copolymer, the silanol condensation catalyst (as it is or as a solution or liquid dispersion) and auxiliary materials to be added if necessary, and extruding them into desired molded products, pellets, or other articles.

The amount of the silanol condensation to be added is small in comparison with that of the copolymer. Thus, as often carried out for incorporating a component in small amount, it is convenient to produce a catalyst master batch wherein a high concentration of the silanol condensation catalyst has been formulated into a dispersion medium such as polyethylene or an ethylene-vinyl acetate copolymer and to add the resulting master batch to the ethylene-unsaturated silane compound copolymer in such an amount that the catalyst is present in a predetermined catalyst concentration.

Instead of adding the catalyst (component B) to the composition in advance as described above, the copolymer can be molded or formed into a desired product and then the molded product can be soaked in a solution or dispersion containing the silanol condensation catalyst.

Thus, it should be understood that the term "composition comprising components (A) and (B)" used herein includes the composition in the form of a coherent mass, such as particles, beads, film, sheets, tubes and molded or formed article, which has the component (B) infiltrated thereinto.

The present composition, as in most of conventional resin compositions, can contain a variety of auxiliary materials such as thermoplastic resin miscible therewith, stabilizers, lubricants, fillers, coloring agents, and foaming agents.

4. Crosslinking

When the molded product of the present composition is exposed to water, a crosslinking reaction takes place. The exposure to water can be generally conducted by contacting the molded or formed product with water (liquid or vapor) at a temperature of from room temperature to about 200° C., normally from room temperature to about 80° C., for 10 seconds to 1 week, normally 1 minute to about 1 day.

To enhance the wetting property of the molded product, the water may contain a wetting agent, a surface active agent, a water-soluble organic solvent or the like. The water can be in the form of normal water, heated vapor, moisture in air, or some other form. It is also possible to conduct the crosslinking reaction simultaneously with the preparation and molding of the present composition by exposing the composition to water when the composition is prepared and molded.

5. Examples of Experiments

EXAMPLES 1 AND 2

A mixture of ethylene, γ-methacryloyloxypropyltrimethoxysilane and propylene used as a chain transfer agent was introduced into an autoclave of 1.5-liter capacity equipped with a stirrer. Into the autoclave was then added t-butylperoxyisobutyrate used as a polymerization initiator. The resulting mixture was caused to react under a pressure of 2,400 Kg/cm$^2$ and at a temperature of 220° C. to continuously synthesize ethylene-γ-methacryloyloxypropyltrimethoxysilane copolymer. The resulting products were substantially odorless. The polymerization conditions and the properties of the resulting copolymers are shown in Table 1. The γ-methacryloyloxypropyltrimethoxysilane used in Examples 1 and 2 contained 90 ppm of methacrylic acid and 180 ppm of chlorine (Cl).

Figure 2:
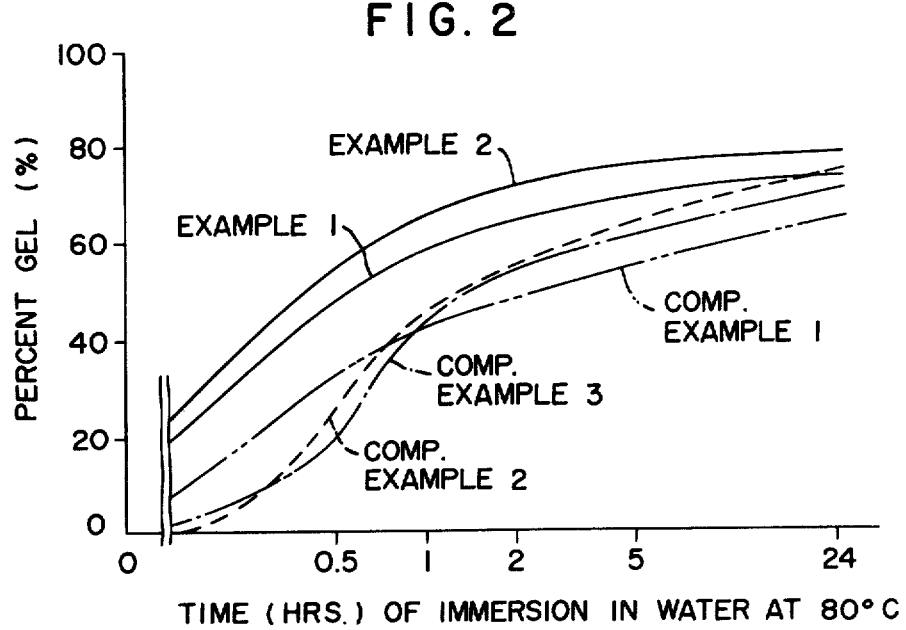
FIG. 2 is a graph indicating crosslinking velocities of the same copolymers when crosslinked in hot water.

To the copolymer was added 5% by weight of a master batch containing 1% by weight of dibutyltin dilaurate. The blended copolymer was formed by means of a 20-mm-diameter extruder, L/D=20, at a temperature of 170° C. into a strand having an outer diameter of about 3 mm. The formed product was allowed to stand in an atmosphere of 23° C./50% relative humidity, or immersed in hot water at 80° C. The percent gel of each exposed product was measured (extracted with xylene for 15 hours at the boiling point thereof). The results are shown in FIGS. 1 and 2.

COMPARATIVE EXAMPLES 1 THROUGH 3

A mixture of ethylene, an ethylenically unsaturated silane compound shown in Table 1, and propylene used as a chain transfer agent was introduced into an autoclave of 1.5-liter capacity equipped with a stirrer. Into the autoclave was then added t-butylperoxyisobutyrate used as a polymerization initiator. The resulting mixture was caused to reaction under a pressure of 2,400

Kg/cm$^2$ and at a temperature of 220° C. to continuously synthesize an ethylene-ethylenically unsaturated compound copolymer. The resulting products were substantially odorless. The polymerization conditions and the properties of the resulting copolymers are shown in Table 1.

The percent gel of each copolymer was measured in accordance with the method described in Examples 1 and 2. The results are shown in FIGS. 1 and 2.

of a master batch containing 1% by weight of dibutyltin dilaurate. The blended copolymer was formed at 170° C. by means of a 20 mm diameter extruder (L/D=20) into a sheet 1 mm in thickness. Melt fracture and fish eyes which had appeared on the surface of the resulting sheet were observed. The results are shown in Table 2.

Furthermore, 25 grams each of pellets of the four copolymers were packaged in a 140 mm × 120 mm moisture-proof aluminum-laminated paper bag formed by

TABLE 1

| | | Polymerization Conditions and Properties of Copolymers | | | | | | | | | |
|---|---|---|---|---|---|---|---|---|---|---|---|
| | | Polymerization Conditions | | | | | | | | Properties of Copolymers | |
| Ex. Nos. | Silane compound | Pressure of polymerization Kg/cm$^2$ | Temperature of gases supplied °C. | Temperature of polymerization °C. | Quantity of ethylene supplied mol % | Quantity of silane compound supplied mol % | Quantity of propylene supplied mol % | Quantity of initiator supplied mol ppm | Percent conversion of ethylene % | *1 Melt index g/10 min. | *2 Content of silane compound |
| | | | | | | | | | | | wt. % | mol % |
| Ex. 1 | γ-methacryloyloxypropyltrimethoxysilane | 2400 | 70 | 220 | 98.2 | 0.017 | 1.8 | 5 | 12 | 1.9 | 0.93 | 0.11 |
| Ex. 2 | γ-methacryloyloxypropyltrimethoxysilane | 2400 | 69 | 220 | 98.1 | 0.026 | 1.8 | 5 | 12 | 2.3 | 1.30 | 0.15 |
| Comp. Ex. 1 | vinyltrimethoxysilane | 2400 | 71 | 218 | 98.7 | 0.074 | 1.2 | 5 | 12 | 1.5 | 0.76 | 0.15 |
| Comp. Ex. 2 | Allyltrimethoxysilane | 2400 | 70 | 215 | 98.9 | 0.230 | 0.9 | 14 | 12 | 2.5 | 0.93 | 0.16 |
| Comp. Ex. 3 | γ-methacryloyloxypropyltriethoxysilane | 2400 | 70 | 220 | 98.5 | 0.024 | 1.5 | 5 | 12 | 2.8 | 1.35 | 0.13 |

Note:
*1 Test method JIS K 6760
*2 Analysis according to melt-colorimetry (molybdenum blue method)

As is clear from the experimental results shown above, the results of Examples 1 and 2, wherein γ-methacryloyloxypropyltrimethoxysilane was used as the unsaturated silane compound, have excellent crosslinking velocity in both an atmosphere of 50% relative humidity at room temperature and hot water at 80° C., in comparison with those of Comparative Examples 1 and 2 wherein vinyl- or allyl-alkoxysilane was used. Especially in Example 2, the percent gel reaches 70% within 1 week at room temperature. The crosslinking velocity in Comparative Example 3 is inferior although γ-methacryloyloxypropyltriethoxysilane was used therein as the unsaturated silane compound.

Thus, it is clear that excellent crosslinking properties are exhibited only when an unsaturated silane compound having a (meth)acrylate group as the copolymerizable group and a methoxy group as the hydrolyzable group were used. It will be appreciated that the present composition has been improved markedly also from the viewpoint of both the time and cost, because it is not necessary to leave the present composition standing for a long time in a thermostatic chamber or hot water as is required in the case of conventional compositions.

EXAMPLES 3 THROUGH 5

Three (3) copolymers were prepared according to the process of Example 2 using γ-methacryloyloxypropyltrimethoxysilane containing various quantities of methacrylic acid (MAA) and chlorine as shown in Table 2. Each of the resulting copolymers and the copolymer of Example 2 was blended with 5% by weight heat-sealing a laminate of craft paper/polyethylene (20μ)/aluminum (12μ)/ethylene-vinyl acetate copolymer (80μ). The packaged copolymer pellets were allowed to stand at room temperature for 3 and 6 months, and then the changes in melt index thereof (JIS K 6760) were measured. The results are also shown in Table 2.

TABLE 2

| Copolymer in the Example of: | Impurities in γ-methacryloyloxypropyltrimethoxysilane | | Appearance of extruded sheets | | Storage stability (g/10 minutes) months | | |
|---|---|---|---|---|---|---|---|
| | MAA (ppm) | Cl (ppm) | melt fracture | fish eyes | 0 | 3 | 6 |
| 2 | 90 | 180 | no | no | 2.3 | 2.2 | 2.1 |
| 3 | 90 | 600 | no | little | 2.3 | 0.5 | 0.08 |
| 4 | 250 | 180 | medium | medium | 2.3 | 1.1 | 0.6 |
| 5 | 250 | 600 | much | much | 2.3 | 0.4 | 0.06 |

What is claimed is:

1. A crosslinkable polyethylene resin composition which comprises:

a component (A) which is a copolymer consisting essentially of ethylene and an unsaturated silane compound represented by the following formula, $$CH_2=\overset{R}{\underset{|}{C}}-\overset{O}{\underset{\|}{C}}-O-(CH_2)_3-Si(OCH_3)_3$$

wherein, R is hydrogen or CH₃ and which has been prepared by copolymerization of monomers consisting essentially of ethylene and the unsaturated silane compound under a pressure of 500 to 4,000 kg./cm.² at a temperature of 100° to 400° C. in the presence of a radical initiator; and a component (B) which is a silanol condensation catalyst, the quantity thereof being in the range of 0.001 to 10% by weight of the total weight of the components (A) and (B).

2. The composition as claimed in claim 1 in which the unsaturated silane compound is represented by the following formula, $$CH_2=\overset{CH_3}{\underset{|}{C}}-\overset{O}{\underset{\|}{C}}-O-(CH_2)_3-Si(OCH_3)_3$$

3. The composition as claimed in claim 1 in which the component (A) is produced from the unsaturated silane compound which does not contain more than 200 ppm of an acid of a formula, $$CH_2=\overset{R}{\underset{|}{C}}-\overset{O}{\underset{\|}{C}}-OH$$

where R is hydrogen or CH₃, and more than 400 ppm of chlorine atom.

4. The composition as claimed in claim 1 in which the content of the unsaturated silane compound copolymerized in the component (A) is 0.001 to 15% by weight of the component (A).

5. The composition as claimed in claim 1 in which said component (A) is prepared under a pressure of 1,000 to 4,000 kg./cm.² and at a temperature of 150° to 350° C.

6. The composition as claimed in claim 1 in which the content of the unsaturated silane compound copolymerized in the component (A) is 0.1 to 5% by weight of the component (A).

7. The composition as claimed in claim 1 in which the content of the unsaturated silane compound copolymerized in the component (A) is 0.05 to 2% by weight of the component (A).

8. The composition as claimed in claim 1 in which the quantity of said silanol condensation catalyst is 0.01 to 5% by weight of components (A) and (B).

9. The composition as claimed in claim 1 in which the quantity of said silanol condensation catalyst is 0.01 to 1% by weight of components (A) and (B).

* * * * *